United States Patent

Yatomi et al.

[11] Patent Number: 5,915,040
[45] Date of Patent: *Jun. 22, 1999

[54] IMAGE PROCESSING APPARATUS

[75] Inventors: Toshiya Yatomi; Akio Fujii, both of Yokohama; Izumi Matsui, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/547,020

[22] Filed: Oct. 20, 1995

Related U.S. Application Data

[63] Continuation of application No. 08/219,548, Mar. 29, 1994, abandoned.

[30] Foreign Application Priority Data

Mar. 29, 1993 [JP] Japan .................................... 5-93559
Mar. 31, 1993 [JP] Japan .................................... 5-96870

[51] Int. Cl.⁶ .............................. G06K 9/36; G06K 9/46
[52] U.S. Cl. ........................................ 382/232; 382/236
[58] Field of Search ................................ 382/232, 234, 382/236, 239, 248, 250; 348/415, 416, 430, 431, 451, 452, 701

[56] References Cited

U.S. PATENT DOCUMENTS

| | | | |
|---|---|---|---|
| 4,982,285 | 1/1991 | Sugiyama | 348/415 |
| 5,091,782 | 2/1992 | Krause et al. | 382/6 |
| 5,191,414 | 3/1993 | Sugiyama | 348/415 |
| 5,227,878 | 7/1993 | Puri et al. | 348/416 |
| 5,268,755 | 12/1993 | Nishino et al. | 348/415 |
| 5,428,693 | 6/1995 | Murakami et al. | 382/232 |
| 5,638,127 | 6/1997 | Murakami et al. | 348/412 |

OTHER PUBLICATIONS

Rober Kutka, "Block Adaptive Frame/Field DCT Coding Decided by the Vertical Different Test," Elservier Science Publishers B.V., 1990, pp. 739–748.

*Primary Examiner*—Phuoc Tran
*Attorney, Agent, or Firm*—Fitzpatrick, Cella, Harper & Scinto

[57] ABSTRACT

An image processing apparatus includes a memory from which a plurality of image signals can be parallelly read out, a read-out circuit for parallelly reading out the plurality of image signals from the memory, a correlation detection circuit for detecting a correlation between the plurality of image signals read out by the read-out circuit, an encoding circuit for encoding the image signals read out by the read-out circuit, and a control circuit for controlling an encoding operation of the encoding circuit in accordance with an output from the correlation detection circuit. The apparatus can simplify the hardware arrangement and allows easy encoding processing.

30 Claims, 8 Drawing Sheets

IMAGE DATA PROCESSING BLOCK
( 8×8 PIXELS )

FIG. 3B

EVEN DATA e0 e1 e2

ODD DATA o0 o1 o2

FRAME MEMORY OUTPUT

IMAGE PROCESSING APPARATUS

This application is a continuation of application Ser. No. 08/219,548 filed Mar. 29, 1994, now abandoned.

BACKGROUND OF THE INVENTION

1. Field of the Invention

The present invention relates to an image processing apparatus and, more particularly, to an image processing apparatus for reading out a video signal from a memory which stores a video signal, and executing processing such as encoding of the readout video signal.

2. Related Background Art

As a conventional apparatus of this type, a movement detection circuit in a digital VTR for converting an image signal into a digital signal, and recording/reproducing the digital signal is known. In this movement detection circuit, after data for one frame are stored in a frame memory, a predetermined number of image data are read out from the memory as one block, a difference between adjacent fields of the readout image data is obtained, and a predetermined calculation is performed using the obtained difference, thereby detecting a movement (interfield correlation) of an image.

However, such a conventional movement detection circuit must have large-capacity memories such as a buffer memory for delay adjustment of interfield correlation calculation, a memory having a capacity corresponding to an image data processing block required upon re-sorting of image data, and the like, and a problem associated with wide distribution of these memories cannot be avoided. In order to divide image data into blocks suitable for frame/field processing before execution of intraframe/intrafield encoding processing, means for re-sorting data, which means includes a memory having a capacity corresponding to an image data processing block, is required, resulting in complicated processing.

Also, the above-mentioned conventional circuit suffers the following drawback since image data is divided into blocks in a frame memory, pixel data in each block are sequentially outputted in the horizontal line direction, and after all pixel data in the horizontal line are outputted, data in the next horizontal line are sequentially outputted.

More specifically, when a difference, in the vertical direction, between adjacent pixel data in a block is calculated, and movement detection is performed on the basis of the total sum of the absolute values of differences, a movement detection unit requires a delay means having at least a delay amount for one horizontal line, and must be designed to have a large delay amount, resulting in a complicated hardware arrangement of the movement detection unit.

SUMMARY OF THE INVENTION

It is an object of the present invention to provide the above-mentioned problems.

It is another object of the present invention to provide an image processing apparatus which can simplify the hardware arrangement, and can easily execute encoding processing.

In order to achieve the above objects, according to one aspect of the present invention, there is provided an image processing apparatus comprising:

(a) a memory from which a plurality of image signals can be parallelly read out;

(b) read-out means for parallelly reading out the plurality of image signals from the memory; and (c) correlation detection means for detecting a correlation between the plurality of image signals read out by the read-out means.

It is still another object of the present invention to provide an image processing apparatus which can reduce the delay amount and the hardware size for movement detection.

In order to achieve the above object, according to another aspect of the present invention, there is provided an image processing apparatus comprising:

(a) a memory capable of storing image signals of a plurality of temporally different frames; and (b) read-out means for dot-sequentially reading out image signals, which spatially correspond to each other, in the plurality of frames from the memory.

The above and other objects and features of the present invention will become apparent from the following detailed description of the preferred embodiments of the present invention taken in conjunction with the accompanying drawings.

DETAILED DESCRIPTION OF THE PREFERRED EMBODIMENTS

The preferred embodiments of the present invention will be described in detail hereinafter with reference to the accompanying drawings.

The flow of data in an image signal reproduction apparatus including an embodiment of the present invention will be described below with reference to FIG. 1.

Figure 1:
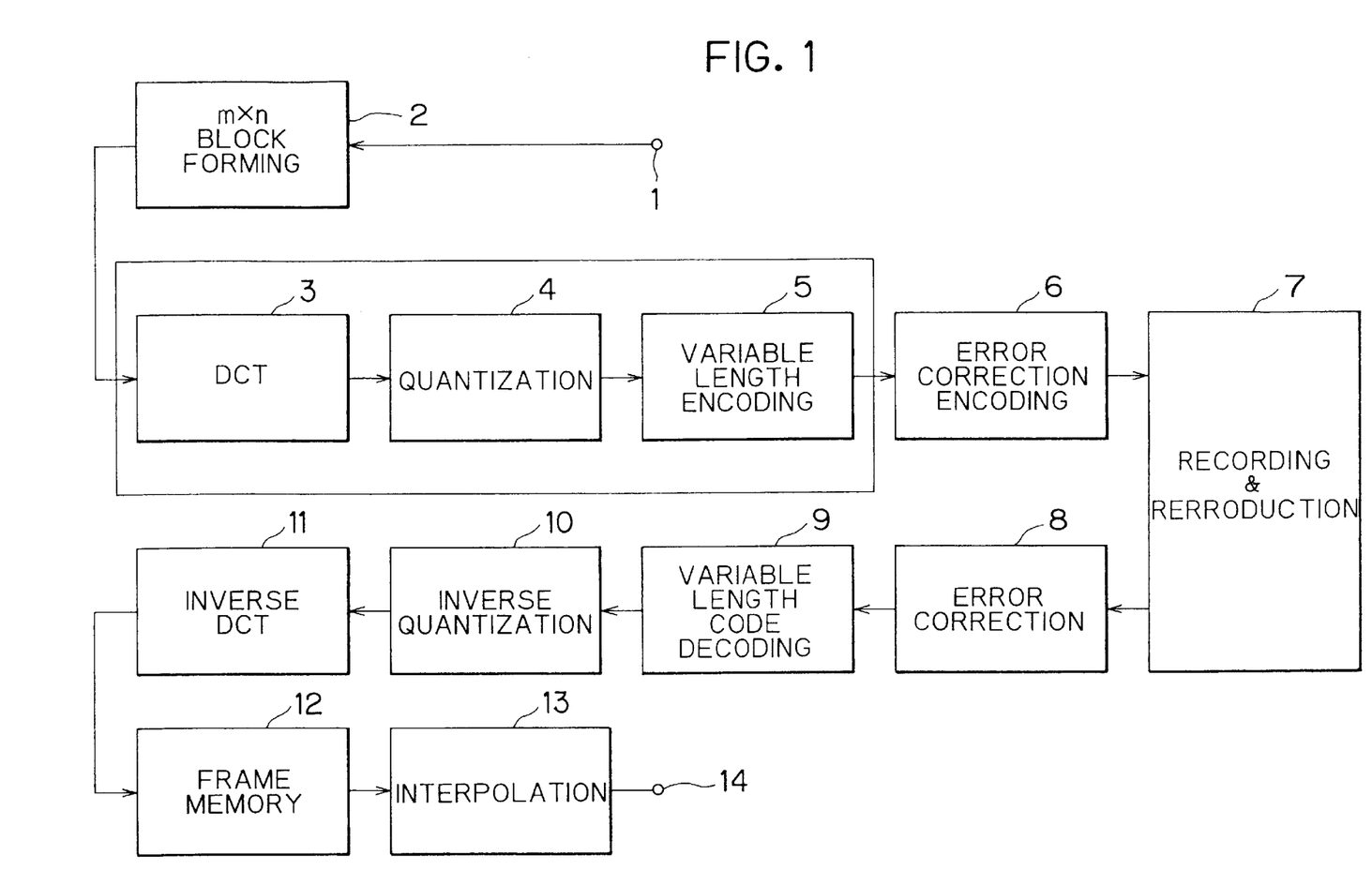
FIG. 1 is a block diagram showing the arrangement of a digital VTR according to an embodiment of the present invention.

FIG. 1 is a block diagram showing the arrangement of a digital VTR including an embodiment of the present invention. Referring to FIG. 1, digital image data is inputted from an input terminal 1, and is divided into blocks in units of frames each including 8×8 pixels or in units of fields each including 4×8 pixels by a block forming circuit 2 in accordance with interfield correlation, as will be described later. Each image data block is subjected to orthogonal transformation in a DCT circuit 3, i.e., is transformed from data in a spatial region into data in a frequency region.

The image data converted into the frequency region is quantized by a quantization circuit 4. The quantized data is encoded by a variable length encoding circuit 5 to obtain a desired data transfer rate. Note that the DCT circuit 3, the quantization circuit 4, and the variable length encoding circuit 5 constitute an encoding circuit 15, and the encoding circuit 15 has field and frame processing functions. The encoded data is subjected to error correction encoding in an error correction encoding circuit 6, and the encoded data is then recorded on a recording medium by a recording & reproduction circuit 7.

In a reproduction mode, data reproduced by the recording & reproduction circuit 7 is inputted to an error correction circuit 8 to be subjected to code error correction. Thereafter, the corrected data is decoded by a variable length code decoding circuit 9. The decoded data is inversely quantized by an inverse quantization circuit 10. The inversely quantized data is then subjected to inverse DCT in an inverse DCT circuit 11 to be transformed from data in the frequency region into data in the spatial region. The transformed data is written in a frame memory 12. The data written in the frame memory 12 is read out in synchronism with raster scanning of, e.g., a monitor, and the readout data is subjected to interpolation of error data in an interpolation circuit 13. Thereafter, the interpolated data is outputted from an output terminal 14, and is displayed on, e.g., the monitor.

Figure 2:
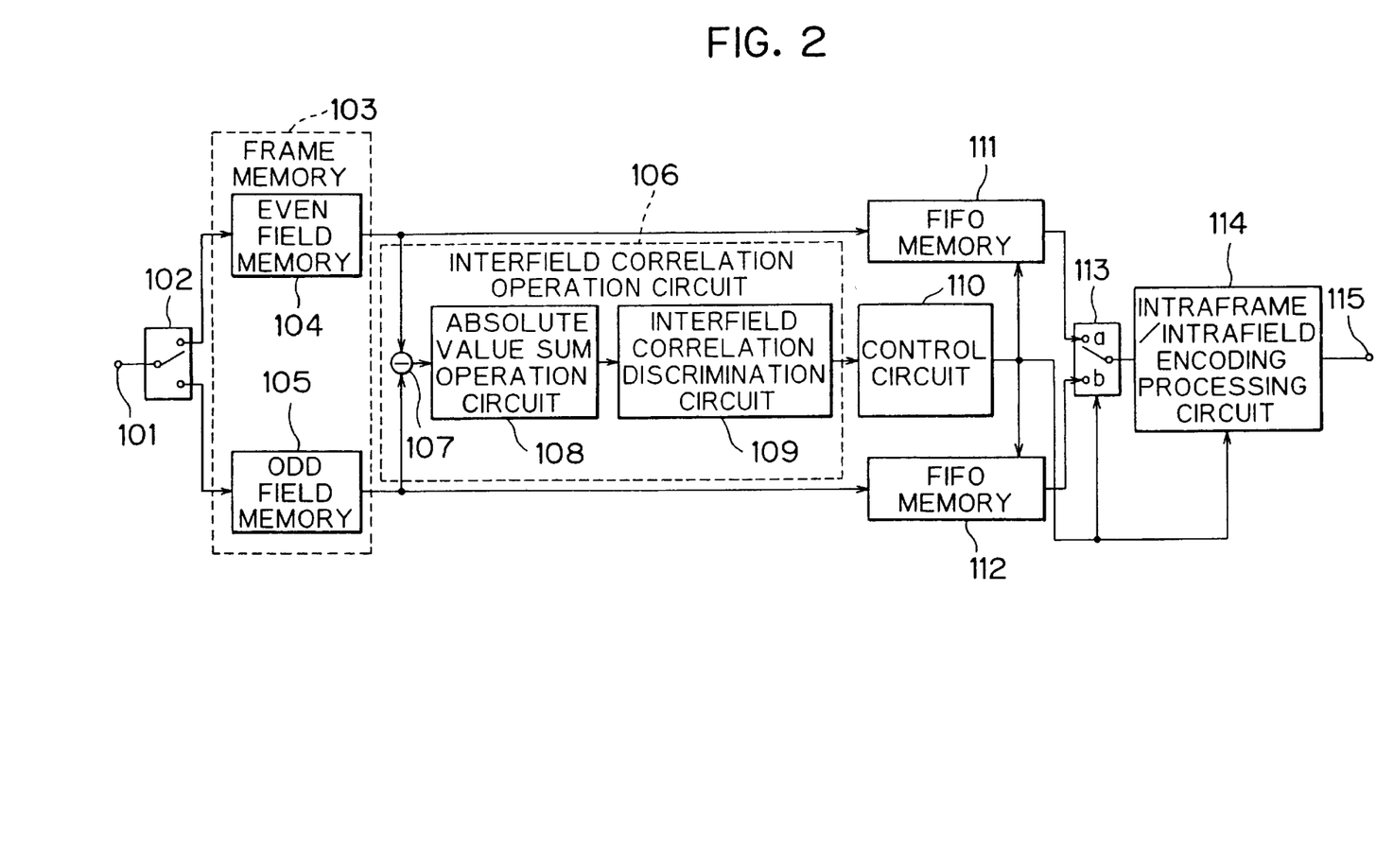
FIG. 2 is a block diagram showing the arrangement of an m×n block forming circuit shown in FIG. 1.

The first embodiment of the present invention will be described below. FIG. 2 is a block diagram showing the arrangement of the m×n block forming circuit 2 shown in FIG. 1.

Referring to FIG. 2, a selector 102 selects a memory for storing image data inputted from an input terminal 101 in accordance with an even/odd field. A frame memory 103 includes field memories 104 and 105. The field memory 104 stores even field data, and the field memory 105 stores odd field data. An interfield correlation operation circuit 106 includes a subtracter 107, an absolute value sum operation circuit 108 for calculating the absolute value sum in an image data processing block, and an interfield correlation discrimination circuit 109.

A control circuit 110 outputs a control signal in accordance with a discrimination result from the correlation operation circuit. FIFO (First In-First Out) memories 111 and 112 receive image data from the field memories 104 and 105. One of the outputs from the FIFO memories 111 and 112 is selected by a selector 113. An intraframe/intrafield encoding processing circuit 114 (denoted by 3 in FIG. 1) performs encoding processing such as discrete cosine transform (DCT), and the like as orthogonal transform in a frame or field in units of blocks. The circuits 111, 112, 113, and 114 are controlled by a control signal supplied from the control circuit 110.

The operation of this circuit will be described below.

Referring to FIG. 2, input image data is written in the field memory 104 or 105 by the selector 102 controlled by an even or odd field. In order to calculate an interfield correlation, according to this embodiment, control is made to output data of corresponding portions in an 8×8 block of even field data from the field memory 104 and odd field data from the field memory 105 in parallel with each other. In this embodiment, since data is read out from the frame memory 103, as described above, the field memories 104 and 105 may comprise FIFO memories.

Also, this embodiment uses, as the interfield correlation operation circuit 106, a circuit for detecting a movement in an image data block in accordance with a difference of interfield data. More specifically, a difference between image data in even and odd fields is calculated by the subtracter 107, and thereafter, an absolute value sum is calculated by the absolute value sum operation circuit 108 by accumulating differences in units of image data processing blocks (each consisting of 8×8 pixels), and calculating the absolute value of the sum of differences. The absolute value sum is inputted to the interfield correlation discrimination circuit 109, and is compared with a predetermined threshold value. The comparison result is inputted to the control circuit 110. The control circuit 110 generates a control signal indicating if intraframe or intrafield encoding processing is to be performed in the encoding processing circuit, on the basis of the comparison result.

When the read-out operation of image data from the FIFO memories 111 and 112, and the switching operation of the selector 113 are controlled in accordance with the control signal, if it is determined based on the operation result from the interfield correlation operation circuit 106 that a correlation between interfield data is strong, the selector 113 selects the readout data to have a data string suitable for intraframe encoding processing; conversely, if it is determined that the correlation is weak, the selector 113 selects the readout data to have a data string suitable for intrafield encoding processing, thus obtaining re-sorted data. The re-sorted data are supplied to the intraframe/intrafield encoding processing circuit 114, and are subjected to intraframe encoding processing (encoding using DCT in units of processing blocks each consisting of 8×8 pixels in a frame) or intrafield encoding processing (encoding using DCT in units of processing blocks each consisting of 4×8 pixels in a field) in accordance with the control signal.

Figure 3A:
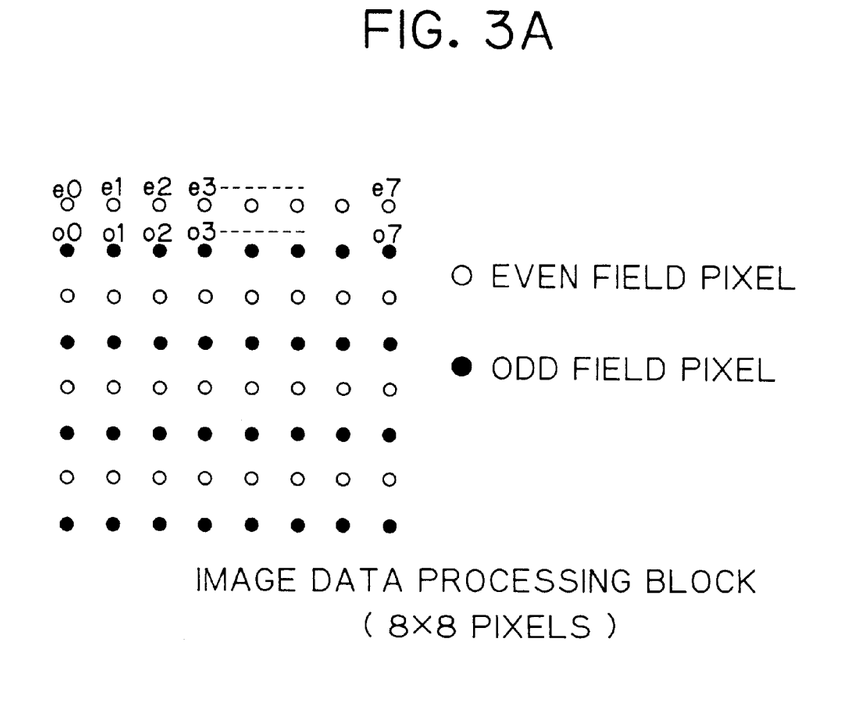
FIGS. 3A and 3B are views for explaining the operation of the circuit shown in FIG. 2.
Figure 3B:
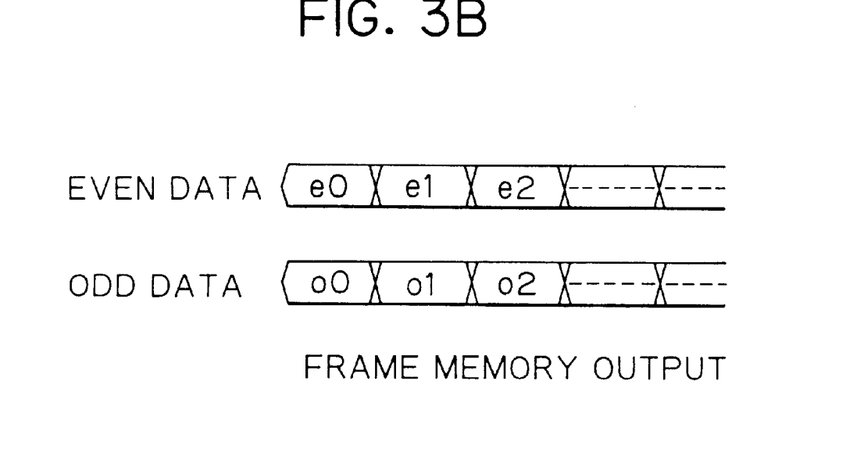

FIGS. 3A and 3B are detailed views showing the order and timings of data read out from the frame memory 103. In FIG. 3A, ● indicates even field data, and ○ indicates odd field data.

As shown in FIG. 3A, if 8×8 pixels in an image data processing block are respectively represented, from the upper left pixel in the block, by e0, e1, e2, . . . , e7, and are also represented, from the leftmost pixel in the second row, by o1, o2, . . . , o7, data are outputted from the field memories 104 and 105 at timings shown in FIG. 3B.

Figure 4:
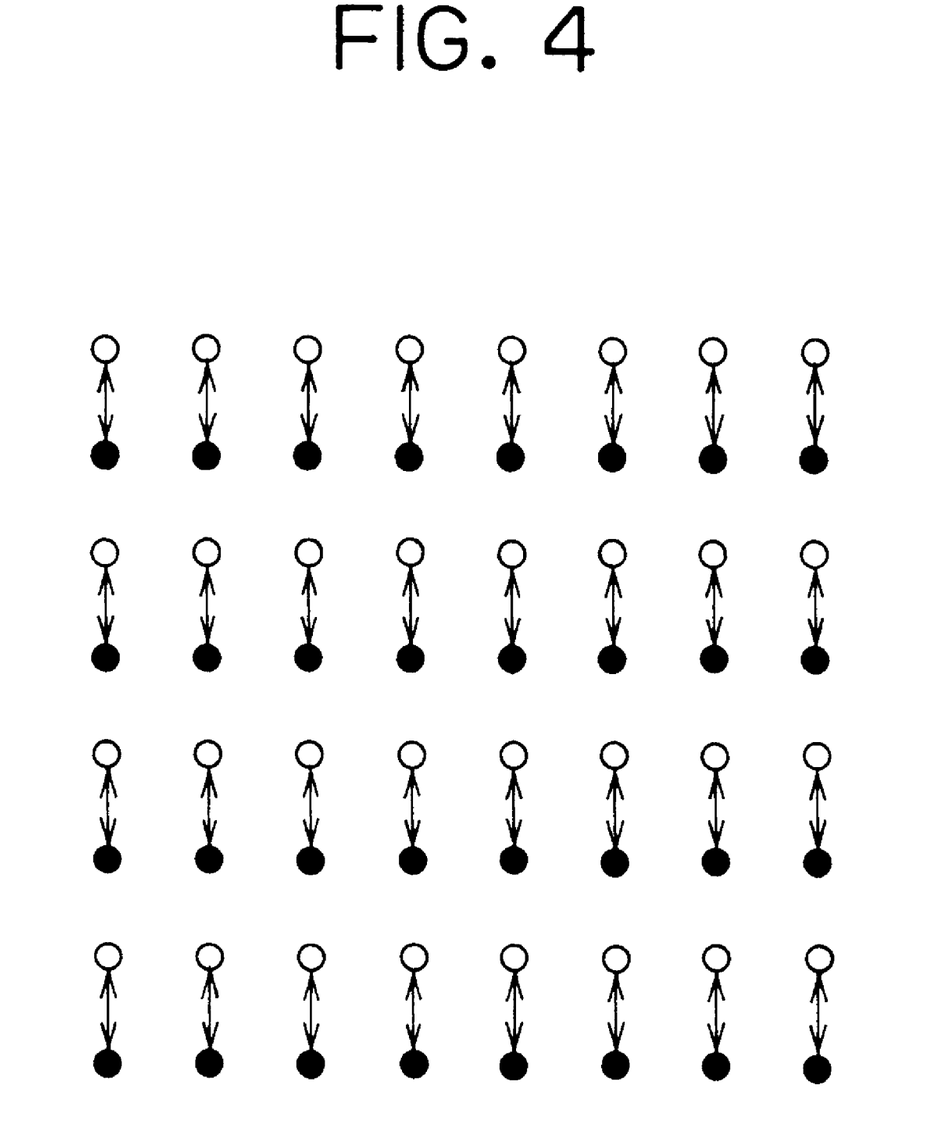
FIG. 4 is a view for explaining the operation of an interfield correlation operation circuit shown in FIG. 2.

FIG. 4 is an explanatory view of the operation of the interfield correlation operation circuit 106 for detecting a movement in an image data processing block (8×8 pixels).

Referring to FIG. 4, a difference between two pixels indicated by each arrow is calculated by the subtracter 107, and the absolute value sum operation circuit 108 then calculates a sum of the absolute values of all difference values indicated by all arrows in an image data processing block. If image data is 8-bit data, the possible output from the absolute value sum operation circuit 108 falls within a range from 0 to 8160. Thus, the threshold value (e.g. 4080) of the interfield correlation discrimination circuit 109 is compared with the output from the absolute value sum operation circuit 108. If the output from the absolute value sum operation circuit 108 is larger than the threshold value, it is discriminated that the interfield correlation is weak; otherwise, it is discriminated that the interfield correlation is strong. The interfield correlation discrimination circuit 109 outputs a signal according to such a weak or strong correlation to the control circuit 110.

Figure 5A:
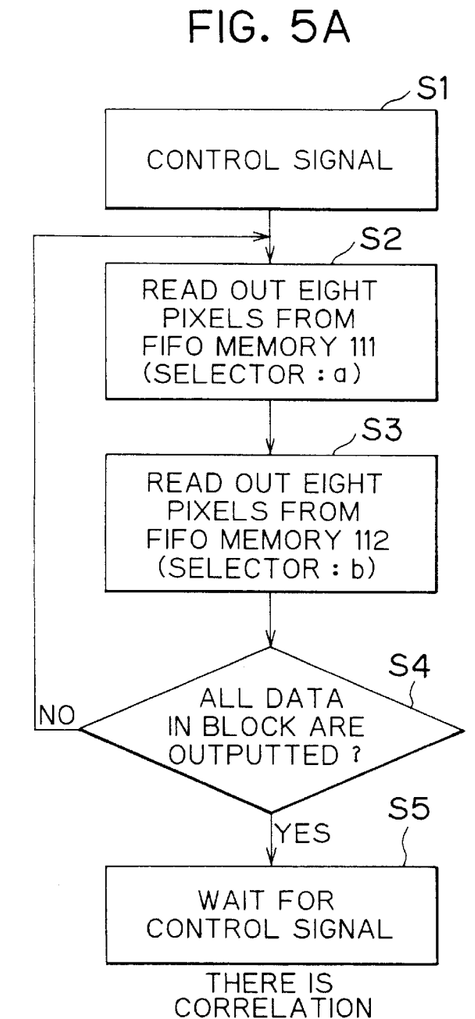
FIGS. 5A and 5B are flow charts for explaining the operation of the circuit shown in FIG. 2.
Figure 5B:
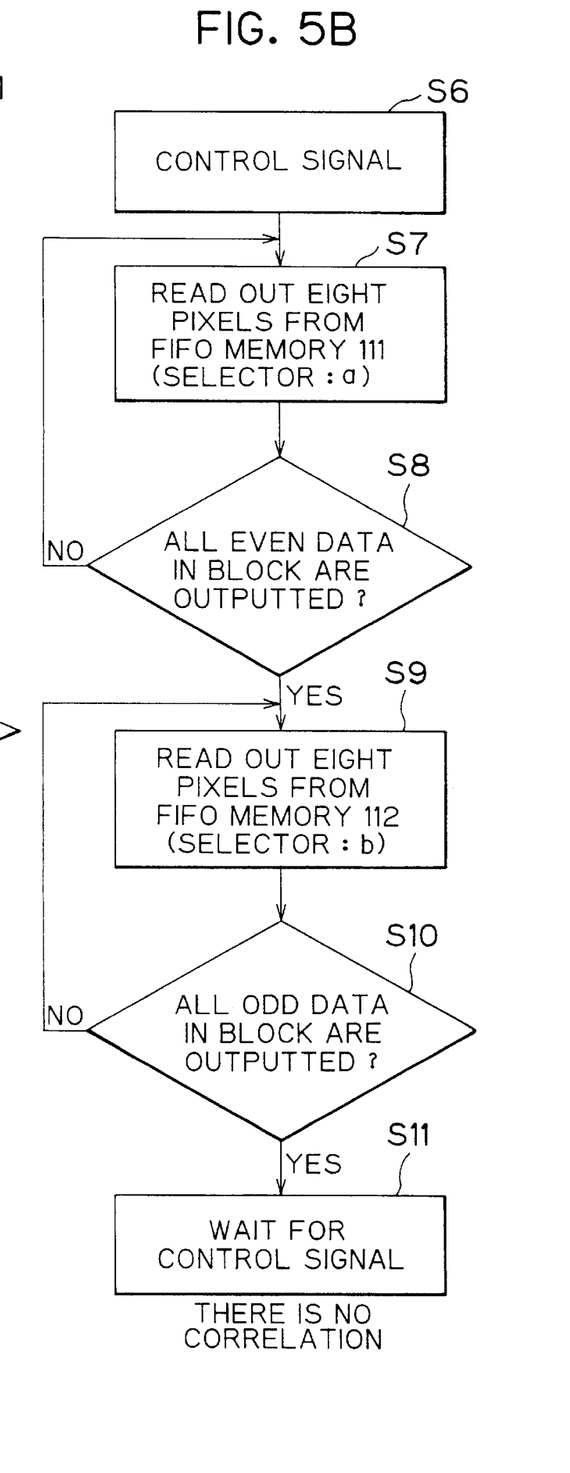

FIGS. 5A and 5B are flow charts showing the operation of the control signal outputted from the control circuit 110, the FIFO memories 111 and 112, and the selector 113.

FIG. 5A shows an operation executed when an interfield correlation is strong. The operation is controlled by the control signal as follows. When the control signal for controlling the read-out operation of image data is inputted from the control circuit 110 in step S1, even field data for 8 pixels are read out from the FIFO memory 111 (the selector 113 is connected to the a side) in step S2. Thereafter, odd field data for 8 pixels are read out from the FIFO memory 112 (the selector 113 is connected to the b side) in step S3. These steps S2 and S3 are repeated until it is determined in step S4 that all data (8×8 pixels) in an image data processing block are read out. Thereafter, the control waits for input of the control signal for controlling the read-out operation of image data in the next processing block (in step S5).

FIG. 5B shows an operation executed when an interfield correlation is weak. The operation is controlled by the control signal as follows. More specifically, when the control signal is inputted from the control circuit 110 in step S6, image data for 4×8 pixels in an even field in a block are read out from the FIFO memory 111 first (at this time, the selector 113 is controlled to be connected to the a side) in step S7. If it is determined in step S8 that all image data in the even field are read out, image data for 4×8 pixels in an odd field in the same block are read out from the FIFO memory 112 (at this time, the selector 113 is controlled to be connected to the b side) in step S9. If it is determined in step S10 that all image data in the odd field are read out, the flow ends.

Figure 6A:
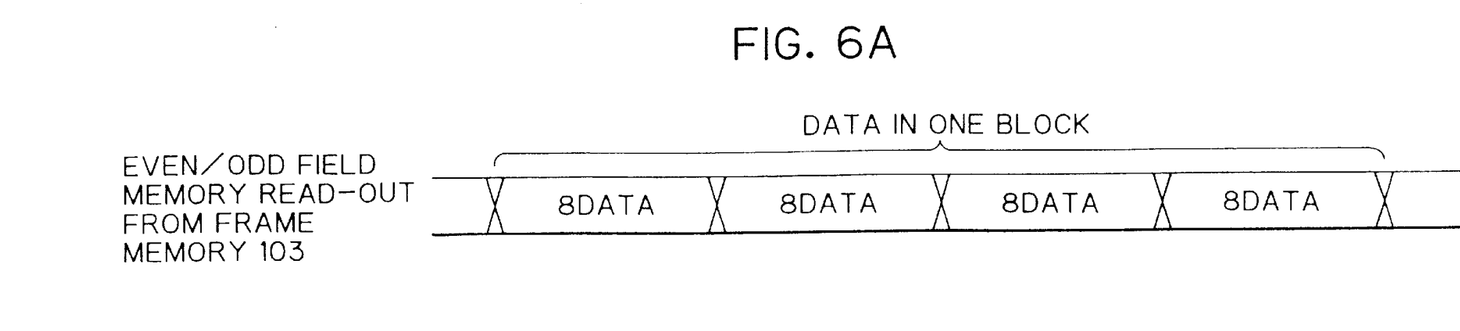
FIGS. 6A to 6C are timing charts showing the operation timings of the circuit shown in FIG. 2.
Figure 6B:
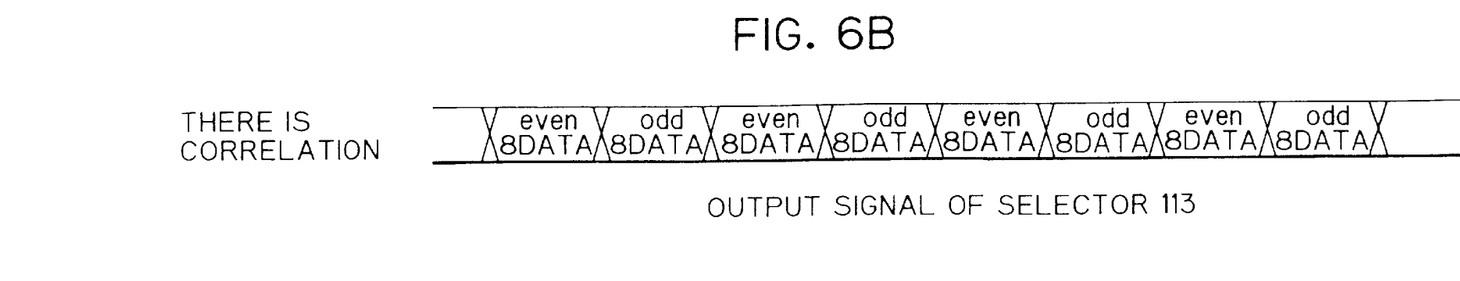
Figure 6C:
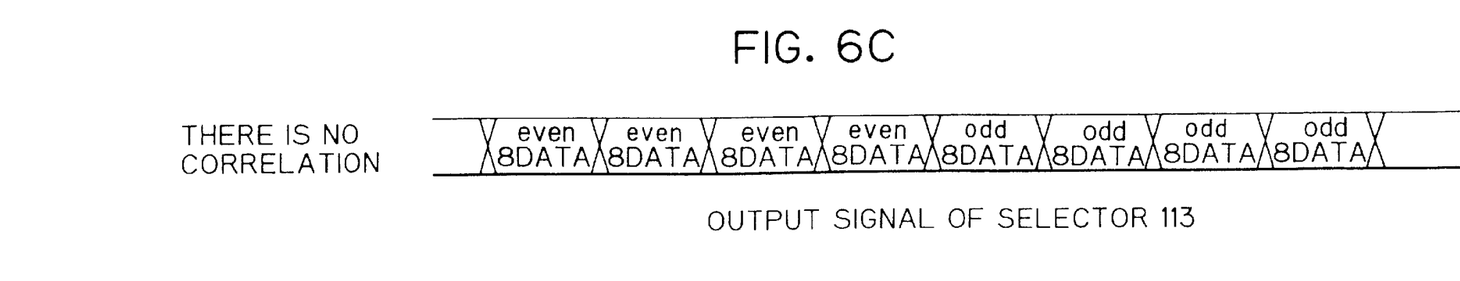

This state will be described below with reference to the timing charts shown in FIGS. 6A to 6C. FIG. 6A shows the read-out timings of image data from the frame memory 103. FIGS. 6B and 6C respectively show the read-out timings of image data from the selector 113 in correspondence with the presence and absence of a correlation. As shown in FIGS. 6A to 6C, since the read-out speed from the frame memory 103 is different from that from the FIFO memories 111 and 112, the FIFO memory 111 is required to have a capacity for 6×8 pixels, and the FIFO memory 112 is required to have a capacity for 4×8 pixels.

In this manner, an intraframe 8×8 pixel block and two intrafield 4×8 pixel blocks are selectively outputted in accordance with interfield correlation, and the encoding circuit 114 can selectively execute processing in units of frames and fields. More specifically, since the DCT circuit 3 performs a DCT operation in units of frame or field blocks having a higher correlation, the number of high-frequency component data after the DCT becomes small in either the frame or field block. Therefore, since quantization coefficients for eliminating high-frequency components in the quantization circuit 4 can be decreased, a high-definition image can be obtained, and an increase in code amount as a whole can be prevented.

Since re-sorting of block data in correspondence with frame/field processing can be realized by only switching the selector 113 in accordance with interfield correlation, an address control circuit for controlling the read addresses of memories can be omitted, and the arrangement can be greatly simplified.

Furthermore, in this embodiment, since the frame memory 103 comprises FIFO memories, the read-out operation from the frame memory 103 (field memories 104 and 105) does not require any address control means unlike in the conventional circuit, and the overall arrangement can be greatly simplified.

As described above, according to this embodiment, when image data is read out in units of blocks, and is subjected to encoding processing, image data corresponding to even and odd fields are parallelly read out from the memories, and interfield correlation operation processing is parallelly executed. Therefore, since a buffer memory required upon execution of a correlation operation, a memory having a capacity corresponding to an image processing block required upon re-sorting of image data, and data re-sorting means in units of frames or fields using this memory can be omitted, the required memory capacity can be greatly decreased, and no complicated data re-sorting processing for decreasing a data amount before intraframe/intrafield encoding processing is required, thus allowing easy block forming processing and encoding processing.

Figure 7:
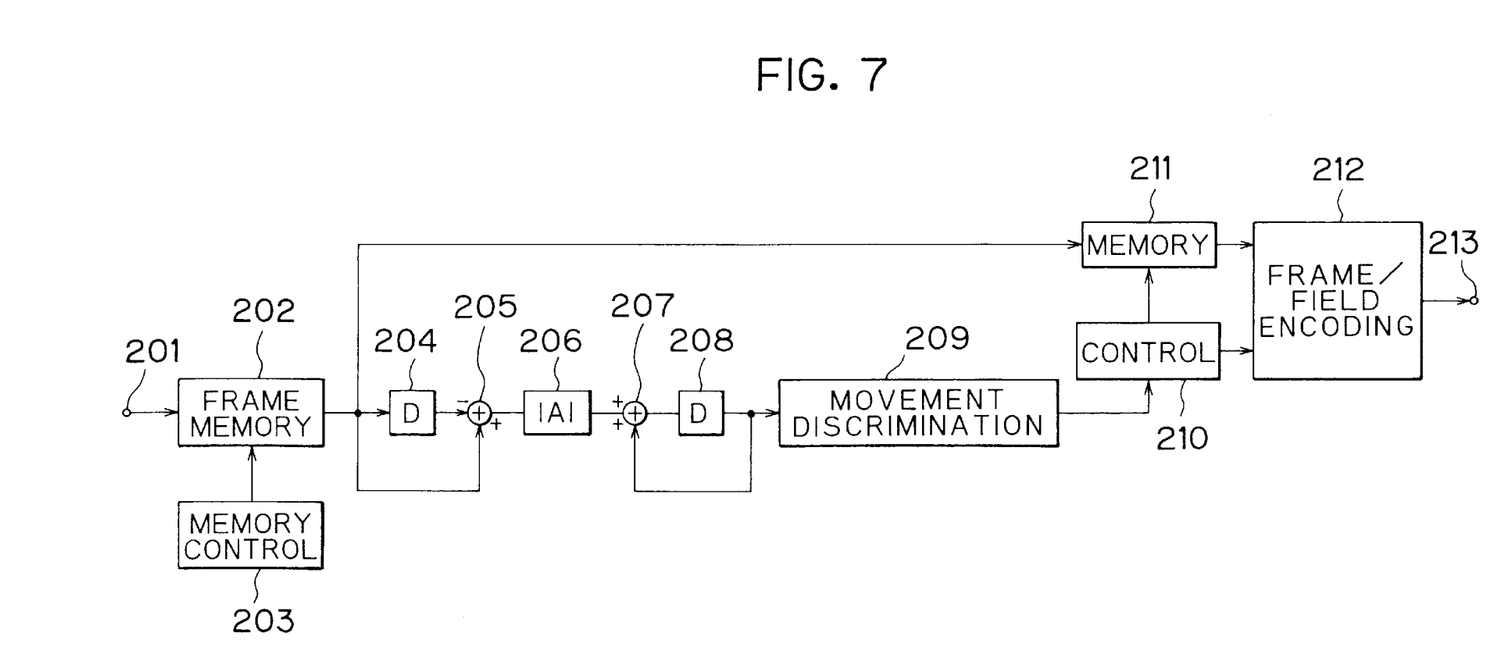
FIG. 7 is a block diagram showing another arrangement of the m×n block forming circuit shown in FIG. 1.

The second embodiment of the present invention will be described below. FIG. 7 is a block diagram showing another arrangement of the m×n block forming circuit 2 shown in FIG. 1. Referring to FIG. 7, a frame memory 202 stores digital image data for one frame which is inputted from an input terminal 201.

A memory control circuit 203 controls the read/write accesses of the frame memory 202. A delay circuit 204 delays data by one pixel data. An adder 205 adds (subtracts) image data from the frame memory 202 and image data from the delay circuit 204. An absolute value operation circuit 206 calculates the absolute value of input digital data. An adder 207 adds image data from the absolute value operation circuit 206 and image data from a delay circuit 208. The delay circuit 208 delays data by one pixel data.

A movement discrimination circuit 209 performs movement detection of an image on the basis of the total sum of the absolute values of differences of image data between adjacent fields. A memory 211 stores image data for 64 pixels. A control circuit 210 controls an encoding circuit 212 to perform processing suitable for a frame or field in accordance with the output from the movement discrimination circuit 209.

The encoding circuit 212 performs encoding, as described above.

In the above-mentioned arrangement, image data inputted from the input terminal 201 is written in the frame memory 202. The memory control circuit 203 reads out image data in units of 8×8 pixels with respect to an image for one image, as will be described later.

Figure 8:
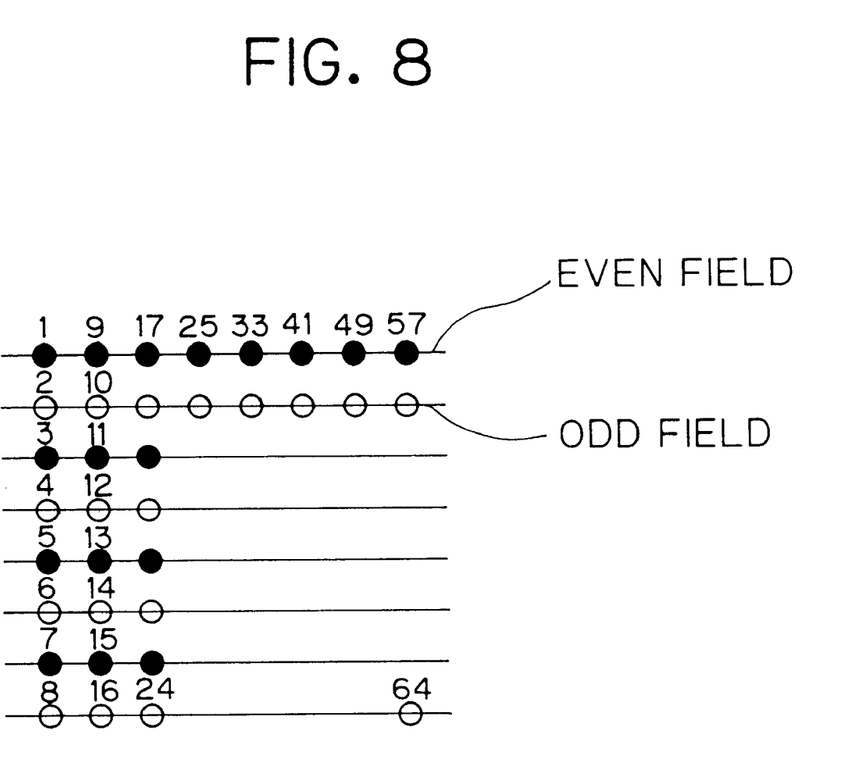
FIG. 8 is a view for explaining the read-out operation of image data in the circuit shown in FIG. 7.

The read-out operation of image data from the frame memory 202 will be described below. FIG. 8 shows a state of image data in one block (8×8 pixels). The memory control circuit 203 reads out image data in even and odd fields in the vertical direction in the order of numbers in FIG. 8. More specifically, image data at spatially corresponding positions in even and odd fields are sequentially read out pixel by pixel. Image data read out from the frame memory 202 in this manner are output to the delay circuit 204, the adder 205, and the memory 211. The adder 205 calculates a difference between image data in the even field and image data in the odd field, and outputs the difference to the absolute value operation circuit 206. More specifically, in this case, differences between first and second image data, between third and fourth image data, . . . in FIG. 8 are calculated.

The absolute value operation circuit 206 converts the input difference data into an absolute value, and outputs the absolute value to the adder 207. The adder 207 adds the input absolute value and the absolute value of difference data delayed by one pixel data by the delay circuit 208. After the adder 207 adds the absolute values of difference data for one block, i.e., 32 difference data, the adder 207 outputs the sum to the movement discrimination circuit 209. This addition operation can be controlled by counting the number of difference data added by the adder 207 using a counter (not shown).

The movement discrimination circuit 209 compares the interfield difference data for one block from the delay circuit 208 with a predetermined threshold value as in the above embodiment, and outputs the comparison result to the control circuit 210. The control circuit 210 controls the memory 211 on the basis of this comparison result to change the read addresses of image data from the memory 211, thereby selectively reading out image data in units of blocks each consisting of 8×8 pixels in a frame or in units of blocks each consisting of 4×8 pixels. The control circuit 210 also outputs a control signal to the encoding circuit 212, and controls it to perform processing suitable for a frame or field in units of blocks of image data outputted from the memory 211.

As described above, although this embodiment requires the memory 211 for forming blocks in units of frames or fields as compared to the above-mentioned embodiment, since the read addresses of the frame memory are controlled, so that pixel data in even and odd field are alternately read out and outputted in the vertical direction, a difference between pixel data of adjacent fields can be calculated by delaying the readout pixel data by one data in a movement detection unit (the delay circuit 204, the adder 205, the absolute value operation circuit 206, the adder 207, and the delay circuit 208). Thus, the arrangement of the movement detection unit can be simplified as compared to that the conventional unit, and the delay amount can be decreased. Therefore, the present invention can be applied to, e.g., a camera-integrated VTR which is required to have a compact structure, and the same effects as described above can be obtained. Since image data is read out from a single memory, the present invention can be applied to a memory which cannot read out image data from a plurality of locations unlike in the above-mentioned embodiment.

What is claimed is:

1. An image processing apparatus comprising:

storage means for storing image signals, said storage means including a plurality of memory means connected in parallel with each other;

read-out means for reading out the image signals in parallel from said plurality of memory means;

correlation detection means for detecting a correlation between the image signals read out by said read-out means; and output means for receiving in parallel the image signals read out from said plurality of memory means, and for outputting the received image signals in a selected order, wherein the selected order is based on the correlation detected by said correlation detection means and is selected from among at least a first predetermined order and a second predetermined order.

2. An apparatus according to claim 1, wherein said storage means can store image signals of a plurality of different time fields.

3. An apparatus according to claim 2, wherein said read-out means parallelly reads out image signals, which spatially correspond to each other, in the plurality of fields from said storage means.

4. An apparatus according to claim 1, further comprising:

encoding means for encoding the image signals output from said output means, wherein said encoding means changes an encoding operation based on the correlation detected by said correlation detection means.

5. An apparatus according to claim 4, wherein said output means changes the order of image signals to an order suitable for the encoding operation by said encoding means.

6. An apparatus according to claim 1, wherein said output means comprises a switching circuit capable of selectively outputting image signals read out from said storage means in units of frames.

7. An image processing apparatus comprising:

a memory capable of storing image signals of a plurality of different time fields of the same frame; and read-out means for sequentially reading out image signals, which spatially correspond to each other, in the plurality of fields from said memory, one pixel by one pixel for each frame, said read-out means reading out the image signals from said memory so that the image signals are read out in the vertical direction on a picture screen in the plurality of fields.

8. An apparatus according to claim 7, further comprising:

correlation detection means for detecting a correlation between the image signals in the plurality of fields read out from said memory.

9. An apparatus according to claim 8, further comprising:

control means for changing an order of image signals read out by said read-out means in accordance with an output from said correlation detection means.

10. An apparatus according to claim 9, further comprising:

encoding means for encoding the image signals read out by said read-out means, wherein said control means further controls an encoding operation by said encoding means in accordance with the output from said correlation detection means.

11. An apparatus according to claim 9, wherein said control means comprises a second memory capable of storing the image signal read out by said read-out means, and a memory control circuit, and changes the order of image signals by changing a read address of said second memory.

12. An image processing apparatus comprising:

storage means for storing image signals, said storage means including a plurality of memory means connected in parallel with each other, for storing the image signals of a plurality of different fields;

read-out means for reading out the image signals in parallel from said plurality of memory means by controlling said storage means, said read-out means reading out in parallel the image signals, which spatially correspond to each other, in the plurality of fields; and output means for receiving in parallel the image signals read out from said plurality of memory means and for outputting the received image signals in a selected order, wherein the selected order is selected from among at least a first predetermined order and a second predetermined order.

13. An apparatus according to claim 12, further comprising:

encoding means for encoding the image signals output from said output means, wherein said encoding means comprises a correlation detection circuit for detecting a correlation between the image signals read out by said read-out means, and performs encoding in accordance with an output from said correlation detection means, said output means changing the order of the image signals in accordance with an output of said correlation detection means.

14. An apparatus according to claim 13, wherein said read-out means reads out the image signals so as to allow said correlation detection means to detect the correlation between the image signals.

15. An image processing apparatus comprising:

storage means for storing image signals, said storage means including a plurality of memory means connected in parallel with each other;

read-out means for reading out the image signals in parallel from said plurality of memory means;

correlation detection means for detecting a correlation between the image signals read out by said read-out means; and output means for receiving in parallel the image signals read out form said plurality of memory means and for outputting the received image signals in a selected order.

16. An apparatus according to claim 15, wherein one frame of the image signals comprises a plurality of blocks each comprising a plurality of pixels, and said output means changes the order of the image signals within one block.

17. An apparatus according to claim 15, further comprising encoding means for encoding the image signals read out by said read-out means, wherein said output means controls an encoding operation by said encoding means in accordance with said correlation detection means.

18. An apparatus according to claim 17, wherein said output means changes the order of the image signals to an order suitable for the encoding operation of said encoding means.

19. An apparatus according to claim 15, wherein said output means comprises a switching circuit capable of selectively outputting image signals read out from said storage means in units of frames.

20. An image processing apparatus comprising:

supply means for supplying a plurality of image signals in parallel as supplied image signals;

correlation detection means for detecting a correlation between the supplied image signals; and output means for receiving in parallel the supplied image signals and for outputting the received image signals in a selected order.

21. An apparatus according to claim 20, wherein said output means determines the selected order in accordance with the detected correlation.

22. An apparatus according to claim 21, wherein said output means determines the selected order to be one of a first predetermined order and a second predetermined order.

23. An apparatus according to claim 20, wherein each of the plurality of image signals supplied by said supply means corresponds to a channel of an N channel image signal, N being an integer greater than 1.

24. An apparatus according to claim 23, wherein said output means outputs the N channels as a single output image signal having one channel.

25. An apparatus according to claim 20, further comprising:

coding means for coding the at least one output image signal to provide at least one coded signal; and recording means for recording the at least one coded image signal on a recording medium.

26. An apparatus according to claim 20, wherein the supplied image signals comprise a plurality of blocks each comprising a plurality of pixels, and said output means changes an order of the image signals within each block.

27. An apparatus according to claim 20, further comprising coding means for coding the at least one output image signal, said coding means changing a coding operation according to the correlation detected by said correlation detection means.

28. An apparatus according to claim 27, wherein said output means changes an order of the received image signals to an order suitable for the coding operation to be used by said coding means.

29. An apparatus according to claim 20, wherein said output means comprises a plurality of memories each of which stores a respective one of the received image signals, and selection means for selectively outputting the received image signals in the selected order from the respective memories.

30. An apparatus according to claim 20, wherein said supply means comprises storing means for storing the plurality of image signals, the plurality of image signals being read out of said storing means in parallel to constitute the supplied image signals.

* * * * *

UNITED STATES PATENT AND TRADEMARK OFFICE
CERTIFICATE OF CORRECTION

PATENT NO. :

5,915,040

DATED    : June 22, 1999

INVENTOR(S) :

TOSHIYA YATOMI, ET AL.

It is certified that error appears in the above-identified patent and that said Letters Patent is hereby corrected as shown below:

On the title page,

AT [56], REFERENCES CITED

Under OTHER PUBLICATIONS,

"Rober" should read --Robert--;
"Different" should read --Difference--; and
"Elservier" should read --Elsevier--.

COLUMN 9

Line 7, "form" should read --from--.

Signed and Sealed this

Sixth Day of June, 2000

Attest:

Q. TODD DICKINSON

Attesting Officer     Director of Patents and Trademarks